Jan. 10, 1967     F. B. MERCER     3,297,509
MANUFACTURE OF PLASTIC BAGS
Filed Feb. 3, 1964     2 Sheets-Sheet 1
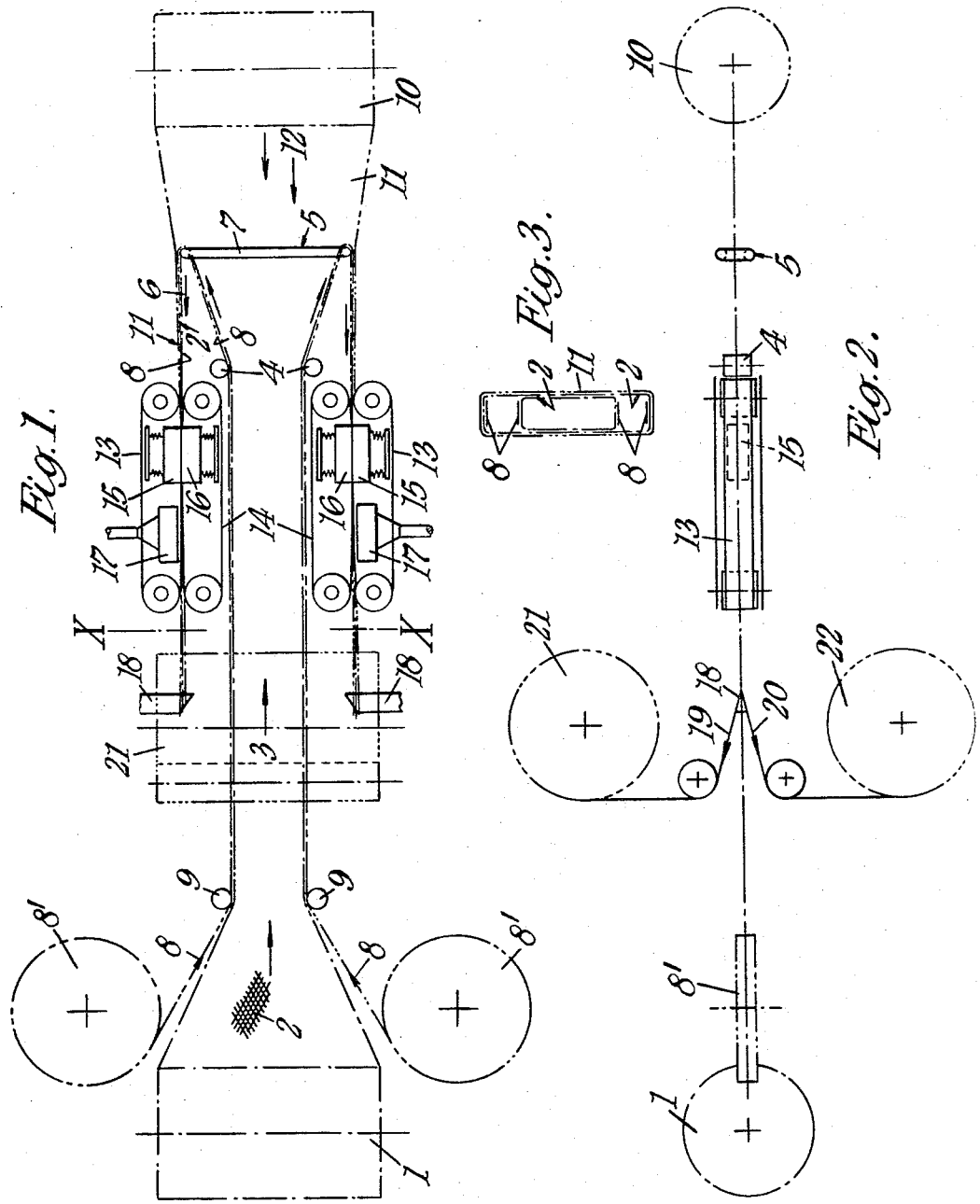

United States Patent Office 3,297,509
Patented Jan. 10, 1967

3,297,509
MANUFACTURE OF PLASTIC BAGS
Frank Brian Mercer, Blackburn, England, assignor to Plastic Textile Accessories Limited, Blackburn, England, a British company
Filed Feb. 3, 1964, Ser. No. 341,984
5 Claims. (Cl. 156—271)

This invention relates to the manufacture of bag tube for the production of layflat bags of the type comprising opposed bag faces of different plastic materials or plastic materials having different characteristics, e.g. having one bag face of plastic net and the other of continuous plastic film.

An object of the present invention is to provide a method and means for the manufacture of continuous bag tube for the subsequent production of layflat bags of the type indicated from continuous length stocks of different plastic materials or plastic materials having different characteristics in tubular form.

A more specific object of the present invention is to provide a method and means for the manufacture of continuous bag tube according to the preceding paragraph for the subsequent production of layflat bags, one face of which is plastic net and the other continuous plastic film.

While the present invention may utilise any plastic net of suitable characteristics, e.g. gauge, mesh size, flexibility, it is preferred to use plastic net having an integral structure, i.e. knotless, whether produced by extrusion, e.g. according to British Patent No. 836,555 or co-pending British patent applications Nos. 2,571/63, 3,296/63, 3,672/63 and 3,673/63.

The plastic film comprising the other bag face component may be of any suitable heat-sealed type and may be transparent, opaque, coloured, patterned, embossed or provided with printed matter or may be formed with integral ribs or the like according to British Patent No. 836,556 or co-pending British patent application No. 29,946/58.

The invention consists in a method of manufacturing bag tubes for the production of layflat bags of the type indicated which comprise advancing a first continuous tube of a first plastic material along a first linear path, reversing the direction of movement of the first tube by turning it inside out so that it passes along a second linear path back over and outside the first linear path, advancing a second continuous tube of a second plastic material along a third linear path aligned with said second linear path and in the same direction of movement and at the same speed as the reversed tube of said first plastic material so that the second tube surrounds and touches, or is closely adjacent to, said reversed first tube and moves therewith, passing the adjacent tubes of said first and second plastic materials through narrow heat and pressure applying zones spaced apart around the periphery of the tubes so as to seal the tubes together along spaced longitudinal sealing lines and thereafter slitting the tubes along the median line of each of said sealing lines to divide the tubes into two or more separated bag tubes having one face of the first plastic material and the other face of the second plastic material.

The above "first plastic material" and "second plastic material" have different physical properties and may comprise chemically different plastic of suitable type; thus the first and second plastic material may differ as regards structure (i.e. one may be of perforated, net or other reticulate form), transparency, opacity, colour, thickness, pattern or printing.

The invention further consists in a method of manufacturing bag tubes for the production of layflat bags of the type indicated and according to the preceding paragraphs, where one of the bag tubes or bag faces comprises net or material of a reticulate structure, wherein there is simultaneously advanced with the overlying tubes of said first and second plastic materials, one of which is of net or reticulate form, continuous heat-sealable plastic tapes along two or more linear paths disposed at spaced distances apart around the periphery of the tubes and adjacent whichever tube comprises net or reticulate plastic material, the overlying tubes and the plastic tapes passing through the heat and pressure applying zones, which latter are disposed only in the paths of said tapes, so that the tapes are sealed to the more remote tube of plastic material through the interstices or openings in the adjacent tube of net or reticulate material, the subsequent slitting being carried out along the median lines of said tapes.

The invention still further consists in a method of manufacturing bag tubes for the production of layflat bags of the type indicated according to the preceding paragraph, wherein said first plastic material is of net or reticulate form and comprises said first continuous tube which is reversed over itself as set forth above and wherein the continuous heat-sealable plastic tapes are advanced with and adjacent to said first tube along two or more linear paths disposed at spaced distances apart around the periphery of the tubes and external thereto and are reversed with the first tube to pass back along said second linear path so that the tapes are located internally of the reversed first tube, the second tube being disposed surrounding the reversed first tube and remote from said tapes so that the tapes are sealed to said second tube through the interstices or openings in the first tube.

The invention still further consists in apparatus for manufacturing bag tubes for the production of layflat bags of the type indicated comprising guide means for leading a first tube of a first plastic material along a first path to and through the inside of a closed figure reversal point member and back over said reversal point member along a substantially co-axial second path over the outside of said first path, which means for leading a second tube of a second plastic material over the outside of said reversal member in the direction of movement of the reversed first tube, two or more pairs of tube conveying or feeding means disposed at spaced distances apart around the periphery of the tubes and between the nip or nips of each pair both the first and second tube walls pass in contact, heat and pressure applying means associated with each of said conveying or feeding means to cause said tube walls in contact to be secured to one another along linear seal lines of small width compared with the tube peripheries and means for slitting the tube walls along the median lines of said linear seal lines to divide the tube into two or more separate bag tubes having one face of the first plastic material and the other face of the second plastic material.

The apparatus, as set forth in the preceding paragraph, for the manufacture of bag tubes for the production of bags in which one face is net or other reticulated material and the other is continuous plastic film, preferably includes continuous heat-sealable plastic tapes advanced to and round said reversal point member along linear paths disposed in alignment with said tube feeding and conveying means, and externally of the first tube, which is the net or other reticulated material, such that on passing round the reversing point member, the tapes pass back along said second linear path internally of the reversed first tube, the heat and pressure applying means associated with the tube feeding and conveying means causing the tapes to seal with the second tube through the interstices or openings in the first tube.

In the accompanying drawings,
FIGURE 1 is a plan view of one form of apparatus suitable for carrying the present invention into effect;

FIGURE 2 is a side elevation, both figures being of diagrammatic form, and

FIGURE 3 is a section of the material employed at section XX of FIGURE 1;

Figure 4:
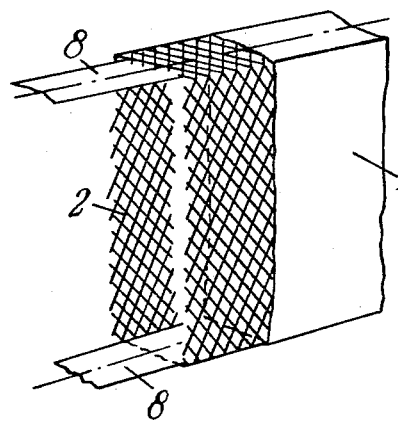
FIGURE 4 is a perspective view of the first and second plastic tubes sealed together before slitting.

In carrying the invention into effect according to one mode by way of example for the manufacture of bag tubes for the production of layflat bags having one face of plastic net material and the other face of plastic film material, a reel 1 of layflat tubular plastic net is suitably supported on trunnion means (not shown) and the net tube 2 is guided along a first linear path, arrow 3, to between a pair of guide rollers 4 and thence through the inside of a closed figure reversal point member 5 around which the net tube is turned inside out and its movement reversed to follow a second linear path 6 extending back opposite to the first linear path 3 and outside the tube passing along the latter.

(By the expression "layflat" used above is meant a tubular plastic net which has been opened out and set in a full width flattened condition, i.e. is not "roped.")

The reversal point member 5 conveniently comprises a rectangular ring of circular cross section having a polished surface and the length of its longer sides 7 is greater than the distance between the guide rollers 4, to allow for the interposition of conveyor means (described hereinafter) between the tube of material moving along the first linear path 3 and the second linear path 6.

At suitable points along the first linear path 3, continuous heat-sealable plastic tapes 8 are led from reels 8' into proximity to the tube 2 of plastic net material by means of guide rollers 9, the tapes being led along paths extending externally on diametrically opposite sides of the tube 2 (see also FIGURE 3). The tapes 8 pass through the reversal point member 5 with the tube 2 and are reversed with the tube so they also follow the second linear path 6, but now lie internally of the reversed tube 2.

On the side of the reversal point member 5 remote from the plastic net reel 1 is mounted a reel 10 of tubular plastic film material (of a nominal diameter similar to that of the net tube 2) opened by the reversal point member 5. The tubular film material 11 is led over the reversal point member 5 along a third linear path, arrow 12, to overlie closely the first tube 2 along its reversed second linear path 6 and to move with it in the direction of the arrow 6.

The two net tubes 2 and 11 and the tapes 8 after passing the plane of the reversal point member 5 pass between diametrically opposed pairs of driven conveyor belts 13, 14, the nip between which grips the tubes and tapes to bring them into close contact and to apply tractive feed to them. Backing the conveyor belts 13, 14 are opposed pairs of heating elements 15, 16 of any known suitable character, which are resiliently urged towards one another to locally heat the material passing between the conveyor belts. The heat and pressure applied by the heating elements 15, 16 is such as to cause the plastic of at least the tapes 8 to soften and adhere to the film of the tube 11 through the interstices or openings in the net tube 2. After the heating elements 15, 16, cooling means 17 such as cold air jet means, are provided to cool the material and set the adhesive bond so that the net tube 2 is, in effect, bonded to the film tube 11 along the length and width of the tapes 8 (see FIGURE 4).

Figure 5:
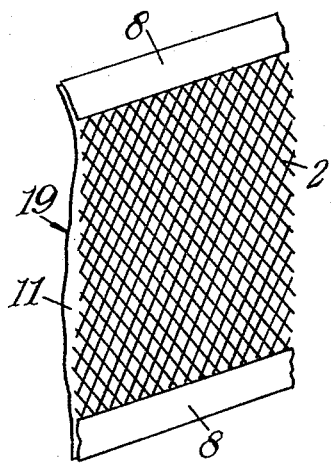
FIGURE 5 is a perspective view of one half of the bag tube product after slitting.

The bonded tubes 2, 11 are then passed on to fixed slitting knives 18 located on the median line of the tapes 8 so that the latter and the net tubes 2 and 11 are slit longitudinally into two separate halves 19 and 20 (see FIGURE 5) which are coiled onto reels 21, 22. Each half tube 19 and 20, therefore comprises bag tubing having one face of net (from the plastic net tube 2) and one face of plastic film (from the plastic film tube 11), bonded together along their longitudinal edges by half widths of the tapes 8.

It will be appreciated that as an alternative to the above arrangement the net plastic material and the film plastic material can be reversed, in which case the plastic tapes are fed to the outside of the plastic net tube which in turn lies outside the plastic film tube which in this case is reversed over the reversal point member.

Figure 6:
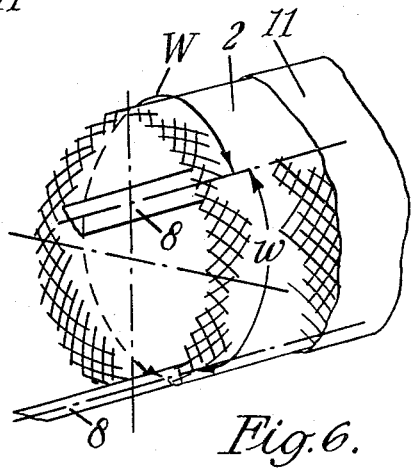
FIGURES 6 and 7 are perspective views similar to FIGURE 4 showing modified forms of the invention.
Figure 7:
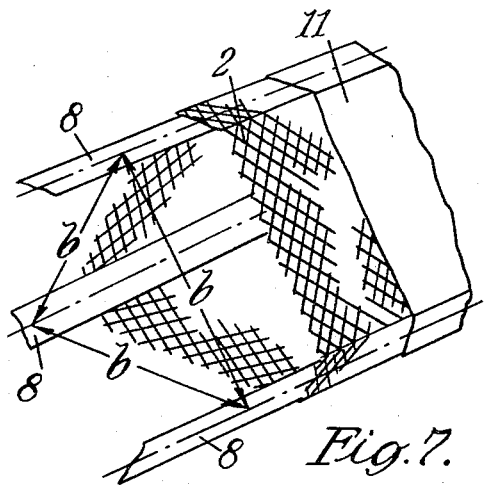

In the apparatus described above with reference to FIGURES 1 to 5, the pair of driven conveyor belts 13, 14, the heating elements 15, 16 and the slitting knives 18 are disposed in diametrically opposite relationships having regard to the tubes 2 and 11 to produce two equal width bag tubes 19 as shown in FIGURE 5. However the apparatus may be modified to produce two bag tube lengths of unequal width by arranging the conveyor belts, heating elements and slitting knives at a closer spacing than diametric, see FIGURE 6, to produce a wide bag width W and a narrow bag width w. Further, more than two bag widths may be produced by increasing the number of tapes 8, conveyor belts, heating elements and slitting knives, see FIGURE 7, where three equal width bag tube lengths b are produced.

I claim:

1. A method of manufacturing bag tubes for the production of layflat bags of the type indicated which comprises advancing a first continuous tube of a first plastic material along a first linear path, reversing the direction of movement of the first tube by turning it inside out so that it passes along a second linear path back over and outside the first linear path, advancing a second continuous tube of a second plastic material along a third linear path aligned with said second linear path and in the same direction of movement and at the same speed as the reversed tube of said first plastic material so that the second tube surrounds and touches, or is closely adjacent to, said reversed first tube and moves therewith, passing the adjacent tubes of said first and second plastic materials through narrow heat and pressure applying zones spaced apart around the periphery of the tubes so as to seal the tubes together along spaced longitudinal sealing lines and thereafter slitting the tubes along the median line of each of said sealing lines to divide the tubes into two or more separated bag tubes having one face of the first plastic material and the other face of the second plastic material.

2. A method of manufacturing bag tubes for the production of layflat bags of the type indicated, as claimed in claim 1, where one of the bag tubes or bag faces comprises net or material of a reticulate structure, wherein there is simultaneously advanced with the overlying tubes of said first and second plastic materials, one of which is of net or reticulate form, continuous heat-sealable plastic tapes along two or more linear paths disposed at spaced distances apart around the periphery of the tubes and adjacent whichever tube comprises net or reticulate plastic material, the overlying tubes and the plastic tapes passing through the heat and pressure applying zones, which latter are disposed only in the paths of said tapes, so that the tapes are sealed to the more remote tube of plastic material through the interstices or opening in the adjacent tube of net or reticulate material, the subsequent slitting being carried out along the median lines of said tapes.

3. A method of manufacturing bag tubes for the production of layflat bags of the type indicated, as claimed in claim 2, wherein said first plastic material is of net or reticulate form and comprises said first continuous tube which is reversed over itself as set forth above and wherein the continuous heat-sealable plastic tapes are advanced with and adjacent to said first tube along two or more linear paths disposed at spaced distances apart around the periphery of the tubes and external thereto and are reversed with the first tube to pass back along said second linear path so that the tapes are located internally of the reversed first tube, the second tube being disposed surrounding the reversed first tube and remote from said tapes so that the tapes are sealed to said second tube through the interstices or openings in the first tube.

4. Apparatus for manufacturing bag tubes for the production of layflat bags of the type indicated comprising guide means for leading a first tube of a first plastic material along a first path to and through the inside of a closed figure reversal point member and back over said reversal point member along a substantially co-axial second path over the outside of said first path, which means for leading a second tube of a second plastic material over the outside of said reversal member in the direction of movement of the reversed first tube, two or more pairs of tube conveying or feeding means disposed at spaced distances apart around the periphery of the tubes and between the nip or nips of each pair both the first and second tube walls pass in contact, heat and pressure applying means associated with each of said conveying or feeding means to cause said tube walls in contact to be secured to one another along linear seal lines of small width compared with the tube peripheries and means for slitting the tube walls along the median lines of said linear seal lines to divide the tube into two or more separate bag tubes having one face of the first plastic material and the other face of the second plastic material.

5. Apparatus, as claimed in claim 4, for the manufacture of bag tubes for the production of bags in which one face is net or other reticulated material and the other is continuous plastic film, wherein continuous heat-sealable plastic tapes are advanced to and round said reversal point member along linear paths disposed in alignment with said tube feeding and conveying means, and externally of the first tube, which is the net or other reticulated material, such that on passing round the reversing point member, the tapes pass back along said second linear path internally of the reversed first tube, the heat and pressure applying means associated with the tube feeding and conveying means causing the tapes to seal with the second tube through the interstices or openings in the first tube.

No references cited.

EARL M. BERGERT, *Primary Examiner.*

D. J. DRUMMOND, *Assistant Examiner.*